April 8, 1952      M. CHEREK      2,592,008
TRACTOR POWER TAKE-OFF
Filed Nov. 12, 1948
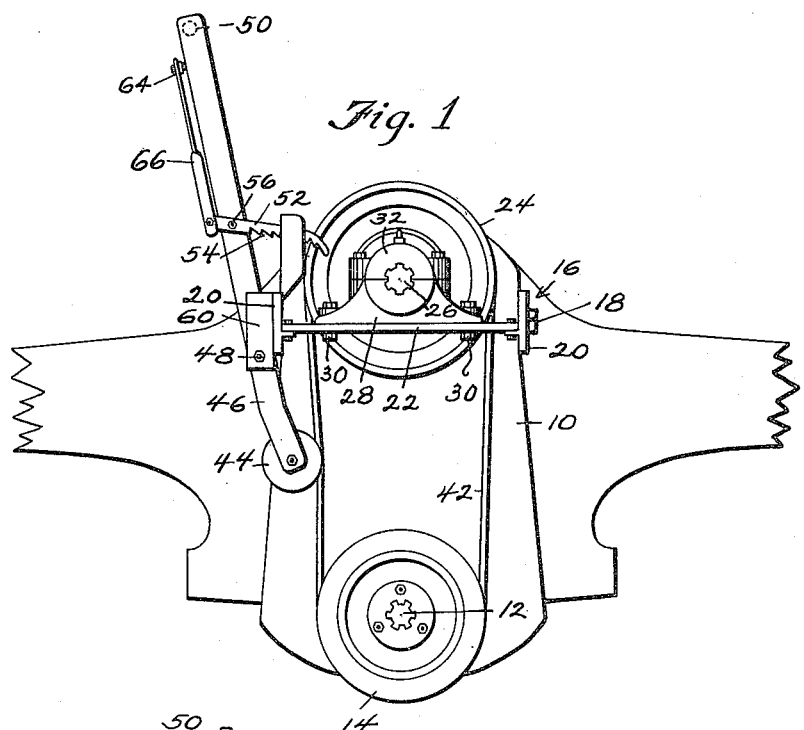
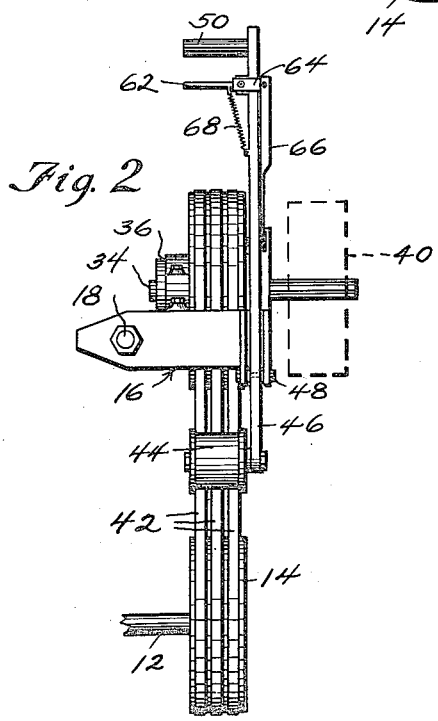
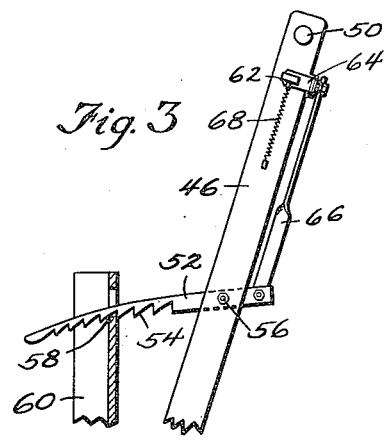
INVENTOR.
MIKE CHEREK
BY Joseph G. Werner Patented Apr. 8, 1952

2,592,008

UNITED STATES PATENT OFFICE 2,592,008

TRACTOR POWER TAKE-OFF

Mike Cherek, Hatley, Wis.

Application November 12, 1948, Serial No. 59,590

3 Claims. (Cl. 74—242.1)

This invention relates to improvements in tractors and particularly to attachments for tractors in the form of power take-off devices for driving various tractor accessories.

The various uses of certain types of tractors, for example, the Ford and Ferguson, are limited in that the lack of elevation of the power shaft pulley prevents the adequate operation of certain farm machinery accessories, and further, the turning and other flexible maneuvering of the tractor is often seriously hampered by the pull from the power shaft.

It is an object of the present invention to avoid the foregoing and other disadvantages of tractors of this type by the provision of an auxiliary power take-off unit which may be readily attached to the tractor and which will elevate the power take-off to a position sufficient to permit adequate operation of tractor driven farm machinery of any character and to avoid any undesirable interference with maneuvering of the tractor.

More specifically, it is an object of the invention to provide a frame which may be bolted or otherwise secured to the tractor such as to the rear axle housing thereof and which rotatably supports an auxiliary power take-off pulley for driven engagement with the lower power shaft pulley, the frame further supporting a lever and locking device readily accessible to the operator for controlling the drive of the auxiliary pulley.

Other objects and advantages will be apparent from the following detailed description taken in conjunction with the accompanying drawings wherein a preferred embodiment of the principles of the invention has been selected for exemplification.

In the drawing:

Fig. 1 is an elevational view of a power take-off device constructed and arranged in accordance with the present invention shown attached to the rear axle housing of a tractor which is illustrated in fragment.

Fig. 2 is a side view of the device shown in Fig. 1 looking from the left hand side thereof; and Fig. 3 is an enlarged detail view of the power transmisson control and belt tightener lever shown in Figs. 1 and 2.

Referring more particularly to the drawing wherein like numerals refer to like parts, a housing for the rear axle structure of a tractor is indicated at 10 and since the construction is conventional and forms no part of the present invention the same is not shown in its entirety. Also, as conventional equipment, the housing 10 is provided with a power shaft 12 splined to the usual or permanent power take-off pulley 14.

Coming now to the novel improvements contemplated by the present invention, a bracket member indicated in its entirety at 16 is suitably secured as by bolts 18 to opposite side walls of the housing 10, the bolts 18 passing through the rearward portion of parallel T-shaped side frame members 20 which are connected at their forward ends by cross bar 22.

The bracket 16 is adapted to support an auxiliary power take-off pulley 24 and stub shaft 26 and, to this end, a pillow or bearing block 28 is suitably secured by bolts 30 to the forward cross bar 22 of the bracket member to cooperate with cap 32 whereby rotatably to support the outer end portion of shaft 26. For rotatably supporting the inner end portion of the auxiliary pulley shaft 26 a similar pillow or bearing block 34 and cap 36 are supported on an inner cross bar, not shown, which extends between the T-shaped side frame members 20 adjacent to bolts 18 and is suitably secured thereto.

The outer projecting end of auxiliary pulley shaft 26 is splined to receive for rotation therewith a detachable sheave 40, as shown by broken lines in Fig. 2, for power takeoff purposes. An endless belt is provided for engagement with the permanent power take-off pulley 14 and auxiliary power take-off pulley 24 whereby to transmit rotary movement from the former to the latter and, while such endless belt may take any desired form, the preferred embodiment of the invention illustrated contemplates that a plurality of relatively narrow belts 42, such as the three shown in Fig. 2, be employed and that the pulleys 14 and 24 be suitably grooved to receive such belts. A plurality of belts as shown, is preferred more adequately to transmit the power necessary for heavy farm machinery accessories and also to provide a better balance and general transfer of power than a single or double belt.

For bringing the belts 42 into driving engagement with the pulleys 14 and 24 and for maintaining the necessary tension upon the belts, idler pulley 44 is rotatably supported at the lower end of an upright lever arm 46 which is pivotally supported intermediate its length as at 48 to an adjacent side frame member 20. The upper portion of arm 46 terminates at a point adjacent to the tractor seat and is provided with a handle 50 for convenient manipulation by the operator.

To lock arm 46 in any selected pivotal position whereby to maintain a constant tension upon belts 42, a ratchet bar 52 having teeth 54 is pivotally secured at 56 to the arm 46 for engagement with the lower wall of a guide slot 58 provided in post 60 which is bolted or otherwise suitably secured to bracket 16, preferably to the adjacent side frame member 20. For releasing the ratchet bar 52 from locking engagement with the slot 58, an operating handle 62 having a shank 64 is pivotally attached to the upper portion of arm 46 at a point adjacent to the handle 50 so that both handles may be simultaneously grasped by the operator. Link 66 connects the handle shank 64 with the outer extremity of ratchet bar 52 in a manner such that upward thrust of the handle 62 will depress the link 66 to effect tilting of the toothed end of ratchet bar 52 upwardly out of locking engagement with the wall of slot 58. Tension spring 68 connected between the handle 62 and its supporting arm 46 tends normally to urge the teeth of ratchet bar 52 into engagement with the slot wall.

Installation of the auxiliary power take-off device of the present invention will be readily apparent from the foregoing, it being necessary merely to secure in place the bolts 18 and to train the belts 42 over the pulleys 14 and 24. The arrangement is such that the belts 42 fit loosely normally to avoid transmission of power from the pulley 14 to auxiliary pulley 24 but to effect driving engagement when tensioned by lever arm 46. Thus, by operation of the lever 46, transmission of power to the auxiliary pulley 24 and to any accessory driven thereby can be broken without the necessity, as heretofore, of stopping the tractor motor.

As an example of the advantages of the present device, it is possible thereby when operating a rotary potato digger of conventional kind to effect more efficient action of the digger and better control over the tractor by removing the front wheels or trucks of the digger. Also, by this expedient, the operator is enabled to back up the tractor while the digger is attached and retain full control over the digger. Further, when desired, the digger may be readily raised out of the ground at the end of rows or elsewhere, an expedient not possible when the digger is driven by the ordinary power take-off pulley of a tractor of the type herein concerned.

It will be understood that the precise device herein illustrated and described is merely exemplary of a number of other modified specific constructions and arrangements of parts embraced by the invention which is restricted only by the scope of the following claims.

I claim:

1. An auxiliary power take-off device for attachment to a tractor having a rear axle housing and a power take-off pulley, said device comprising parallel side frame members, attaching means for securing said side frame members to said tractor rear axle housing to extend rearwardly of the tractor at opposite lateral sides of said housing, said side frame members defining a horizontal opening above and in substantially vertical alignment with said power take-off pulley, an auxiliary power take-off pulley supported above said horizontal opening, endless belt means connected between said pulleys, an upright arm pivotally secured to one of the side frame members and an idler pulley carried at the lower end of said arm for engaging and tightening said endless belt means to transmit power from said power take-off pulley to said auxiliary power take-off pulley.

2. The device of claim 1 additionally including means for locking the upright arm in selected pivoted position whereby to hold the idler pulley in tightening engagement with the endless belt means.

3. The device of claim 2 wherein the locking means includes a ratchet bar pivotally secured to the upright arm and ratchet bar stop means carried by one of the side frame members for engaging said ratchet bar.

MIKE CHEREK.

REFERENCES CITED

The following references are of record in the file of this patent:

UNITED STATES PATENTS

| Number | Name | Date |
| --- | --- | --- |
| 314,906 | Young | Mar. 31, 1885 |
| 1,648,128 | Jaeger | Nov. 8, 1927 |
| 2,165,754 | Hornack | July 11, 1939 |
| 2,284,441 | Murad | May 26, 1942 |